United States Patent [19]

Engelsmann et al.

[11] 4,281,911
[45] Aug. 4, 1981

[54] MOTORIZED FILM-TRANSPORTING MECHANISM

[75] Inventors: Dieter Engelsmann, Unterhaching; Reinhard Nicko; Leo Lippl, both of Munich; Dieter Maas, Pöring, all of Fed. Rep. of Germany

[73] Assignee: Agfa-Gevaert AG, Leverkusen, Fed. Rep. of Germany

[21] Appl. No.: 133,123

[22] Filed: Mar. 24, 1980

[30] Foreign Application Priority Data

Apr. 12, 1979 [DE] Fed. Rep. of Germany ....... 2915098

[51] Int. Cl.$^3$ .............................................. G03B 1/18
[52] U.S. Cl. .................................... 354/173; 354/218
[58] Field of Search ............... 354/173, 204, 206, 212, 354/213, 214, 215, 217, 218

[56] References Cited

U.S. PATENT DOCUMENTS

| | | | |
|---|---|---|---|
| 2,632,369 | 3/1953 | Estes | 354/218 |
| 3,135,182 | 6/1964 | Hintze et al. | 354/217 |
| 3,169,460 | 2/1965 | Winkler et al. | 354/173 |
| 3,925,798 | 12/1975 | Sanada et al. | 354/217 |
| 4,149,793 | 4/1979 | Date | 354/214 |
| 4,208,120 | 6/1980 | Zachmeier et al. | 354/173 |
| 4,240,734 | 12/1980 | Nomura et al. | 354/173 |

FOREIGN PATENT DOCUMENTS 2256795  6/1974  Fed. Rep. of Germany .......... 354/173

*Primary Examiner*—Russell E. Adams
*Attorney, Agent, or Firm*—Michael J. Striker

[57] ABSTRACT

A motorized film-transporting mechanism for roll film cameras has a motor-circuit switch arranged in the path of movement of a film sensor so as to be closed when a film is present in the camera. A film counter is biased to zero position when the camera back is opened. When a film is present in the camera and the back is closed, the motor is automatically energized to advance the film by a length corresponding to two film frames so as to move this usually spoiled (light-blackened) film length out of the way. The motor is then automatically de-energized and all components are in readiness for subsequent picture-taking and incremental film advance by one film frame each. When all exposures have been made the film is rewound by the motor which shuts down when rewinding is completed.

6 Claims, 1 Drawing Figure

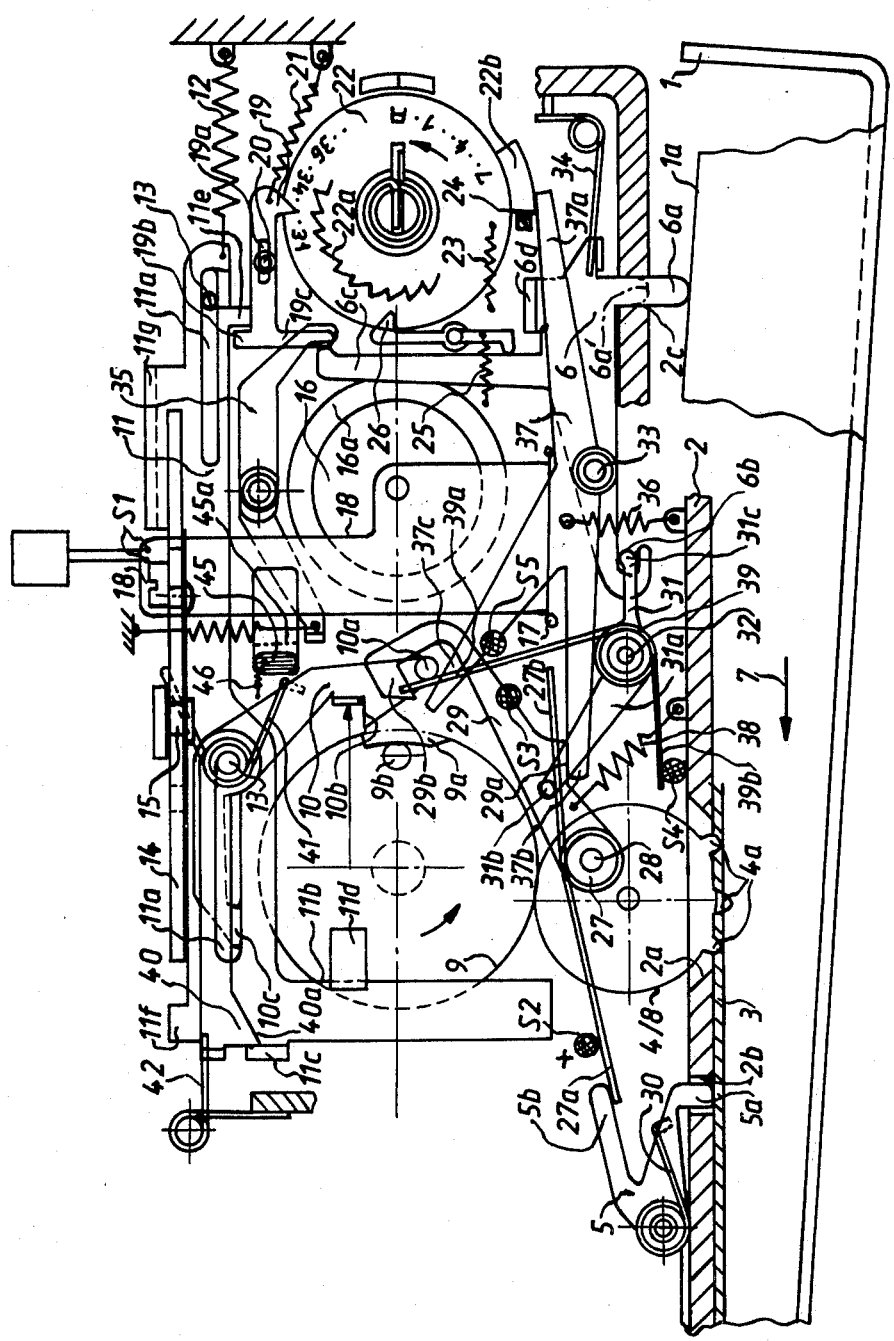

MOTORIZED FILM-TRANSPORTING MECHANISM

BACKGROUND OF THE INVENTION

This invention relates to film transporting mechanisms in general, and to motorized film transporting mechanisms in particular.

Still more specifically, the invention relates to electrically driven motorized film transporting mechanisms.

A roll film camera using an electric motor to transport film, is known from German Published Application OS No. 2,256,795. A motor-controlling switch is closed in response to the insertion of film into the camera and automatically opens when no film is present in the camera. When roll film is inserted into a camera a film portion located ahead of the first film frame and having a length corresponding to that of two film frames, is usually unavoidably exposed to light and thus spoiled for exposure purposes. This length must therefore be advanced in the camera to move it out of the way and place the first unspoiled film frame in picture-taking position. A problem with the aforementioned prior-art camera is that it has no provision for effecting automatic advancement of the film by this two-frame length on closing of the camera back, i.e. of the rear cover which closes the film chamber. Film rewinding after completion of the picture-taking is not possible in this camera, either.

A miniature camera is known from German Pat. No. 1,232,820 in which closing of the camera back automatically places the film counter into operative position, whereas opening of the back causes the film counter to return to zero (starting) position. However, motorized transport of the film by a two-frame length on closing of the camera back, and motorized film rewinding on completion of picture-taking, is not disclosed in this reference either.

SUMMARY OF THE INVENTION

It is an object of the present invention to provide an improved motorized film-transporting mechanism which is not possessed of the prior-art disadvantages.

A more particular object of the invention is to provide a film-transporting mechanism of the type in question, wherein the insertion of a film into the camera and closing of the camera back results in the transporting mechanism being automatically placed into a readiness condition in which it can subsequently perform its assigned functions. These functions include the automatic advancement of the film by two film-frame lengths in response to closing of the camera back, thereupon an exposure and film-transport by one film length in response to each operation of the shutter release, latching of a film-rewinding member in its rewinding position until rewinding is completed, and automatic deactivation of the film transporting motor on completion of rewinding.

In pursuance of the above objects and of still others which will become apparent hereafter, one feature of the invention resides in a motorized film-transporting mechanism which, briefly stated, comprises a film counter having a projection and being movable to counting position in response to closing of the back wall and to zero position in response to opening of the back wall; switch means operative for controlling the supply of electrical energy to a camera motor and being movable to closed position in response to insertion of film into the camera and to open position in response to the absence of film in the camera; a control lever having an arm engaging the projection when said film counter is in the zero position and becoming disengaged therefrom in response to repeated stepwise operation of the film counter; a switch in series with the switch means and being closed when the back wall is closed; and a blocking lever engaged by the control lever when the arm engages the projection and becoming released from the control lever when the arm disengages from the projection, so that the blocking lever can cooperate with a film metering means upon transportation of the film by the length of a film frame resulting in deenergization of the motor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

The single FIGURE is a fragmentary sectioned plan view illustrating an embodiment of the invention.

DESCRIPTION OF THE PREFERRED EMBODIMENTS

The FIGURE shows only those portions of a still camera provided with the invention, which are essential to an understanding of the invention. The camera is shown in a condition in which a film has been inserted into it but the back cover is not yet closed.

With this in mind it will be seen that reference numeral 1 identifies the back cover of the camera, which is provided with an actuating arm 1a. A supporting member 2, along which the film 3 moves during advancement and rewinding, has three cut-outs 2a, 2b and 2c. The teeth 4c of a film entraining (sprocket) wheel 4 extend through the cut-out 2c so that they can engage with the sprocket holes of the film 3, there being several of these sprocket holes provided per film frame. An arm 5b of a film-sensing lever 5 enters into cut-out 2b and an arm 6a of a control lever 6 enters into cut-out 2c. The film 3 is mounted on a pay-out spool and its leading end is connected to a take-up spool; when the latter is rotated by an electric motor the film is advanced and when the picture-taking is completed and the pay-out spool is rotated in reverse, the film is rewound. Neither the spools nor the motor are shown, since this aspect of the description is known per se from the prior art and requires no explanations.

Film advancement is in the direction indicated by the arrow 7; rewinding takes place counter to arrow 7. During advancement the film 3 rotates the sprocket wheel 4 in clockwise direction, during rewinding in anticlockwise direction. A gear 8 (hidden behind wheel 4) is coupled with wheel 4 by means of a (not illustrated but known per se) one-way coupling which acts only when wheel 4 turns in clockwise direction. Gear 8 meshes with a gear 9 which is provided with a peripheral cut-out 9a and with a cam projection 9b. After each anti-clockwise revolution of gear 9 (resulting from clockwise revolution of wheel 4) a lever 10 enters cut-out 9a (in a manner to be described later) and thus terminates the film advancement after a film length corresponding to one film frame has been advanced. Conversely, when the film is being rewound neither the gear 8 nor the gear 9 rotates, since during anti-clockwise rotation of wheel 4 the coupling connecting it to gear 8 does not transmit motion to the latter.

A slide 11 is movable in direction parallel to the film-transport direction and serves to operate the camera shutter (not shown). It is biased in one direction by a spring 12 and has slots 11c into which pins 13 extend to delimit the movement of slide 11. The slide has an arm 11b, a lug 11c, a control arm 11d, a film-counter actuator 11e and a latching lug 11f. An arresting device (not shown) may cooperate with teeth 11g of slide 11.

A shutter release arm 14 is turnable about a pivot 15. A plate 18 is pivotable about a pivot 17 and operates to pivot arm 14 in clockwise direction. Plate 18 is located beneath a shutter release which is in form of a diaphragm 16 mounted in tensioned state in a ring 16a. When the arrangement is in a position ready for release of the shutter the lug 11f engages the arm 14. When film 3 is in place in the camera, the back cover 1 is closed and the slide 11 moves counter to arrow 7, the member 11e disengages from a counter-actuating pawl 19 which is mounted in slot 19a on a pivot 20, so that the spring 21 which engages it at an angle draws the pawl 19 into engagement with the teeth 22a of a film counter wheel 22. When slide 11 is moved in direction of the arrow 7 the member 11e engages portion 19b of pawl 19 so that the pawl turns wheel 22 by an angular increment corresponding to one tooth, and thus by one film-frame number. Pawl 19 additionally has an arm 19 and wheel 22 a projection 22b. Wheel 22 is biased by spring 23 which, when cover 1 is in open position, draws projection 22b against an abutment 24. An anti-reversing pawl 26 is biased by a spring 25 and engages with teeth 22e when cover 1 is closed, so that the wheel then cannot move backwardly out of its counting position.

A main switch S1 is provided for switching on a (not illustrated but known per se) exposure control circuit and possibly also the (similarly not illustrated) electric film-transporting motor. When shutter release 16 is operated the plate 18 closes the switch S1 before the arm 14 is actuated. Four additional switching contacts S2, S3, S4 and S5 are provided; of these, contact S2 is connected with the positive pole of the motor-energizing battery (not shown), switch S3 with the positive pole of the motor, switch S4 with the negative pole of the motor and switch S5 with the negative pole of the battery. The contacts S2 and S3 can be bridged by the arm 27a, 27b of a spring 27 which is wound about a pivot 28 of a lever 29. Arm 27a engages an arm 5b of the film sensing lever 5 which is biased towards the film 3 by a spring 30. When no film is present in the camera the arm 5a enters the cut-cut 2b; spring 30 overcomes spring arm 27a so that lever arm 5b deflects spring arm 27a towards film 3, i.e. out of engagement with the electrical contact S2, thereby interrupting the current supply circuit for the motor. If, however, film 3 is present in the camera as illustrated, then the film presses the arm 5c inwardly of the cut-out 2a, deflecting arm 5b in anti-clockwise direction so that it allows spring arm 27a to engage the contact S2.

Spring arm 27b is engaged by an arm 31a—or rather an angled-off lug 31b—of a lever 31 what is turnable about pivot 32. The lever 31 has another arm the end 31c of which is located in a fork of lever 6 which is turnable about pivot 33; a spring 34 urges lever 6 through cut-out 2c. An arm 6c of lever 6 is engaged by the pawls 19, 26 and by a rewind blocking lever 35. A triple-armed control lever is also turnable about pivot 33 and engages a lug 6d of lever 6 under the influence of a biasing spring 36. Arm 37a of lever 37 engages projection 22b when cover 1 is open, and arm 37b retains end portion 29a of lever 29 against movement under the influence of spring 38. Lever 29 has a generally U-shaped end portion 29b which surrounds a pin 10a of lever 10 at three sides with clearance. The arm 37c of lever 37 is located adjacent the fourth side of pin 10a. A lug 39a of the spring 39 which bridges the electrical contacts S4 and S5 also engages the pin 10a. In the illustrated position, with cover 1 open, the leg 39a engages contact S5 and leg 39b engages contact S4, but the motor is not yet energized because the electrical circuit is not yet closed via contact S3.

If, now, the cover 1 is moved to closed position, the arm 6c of lever 6 is pressed in anti-clockwise direction inwardly of the camera. This causes arm 6c to release the pawls 19, 26 so that they can engage teeth 22a of wheel 22 for the purposes described earlier. The lever 35 is also released in preparation for later activation. In addition, anti-clockwise pivoting of lever 6 displaces lever 31 in clockwise direction via portion 6b so that portion 31b releases the spring arm 27b for engagement with contact S3. The current supply circuit for the motor is now closed (upon insertion of a film into the camera and closing of the cover 1) and this results in the film take-up spool (not shown) being turned by the energized motor so that film is advanced in direction of the arrow 7.

During this automatic transportation the wheel 4 is turned by the advancing film, causing the gear 9 to be rotated (via gear 8) through two complete revolutions from the illustrated starting position, in anti-clockwise direction. This causes the cam projection 9b to move the slide 11 twice in direction of arrow 7 beyond the illustrated position in which its lug 11c is held by a lever 40, and allows it to return (slide) back to the illustrated position. This causes the pawl 19 to turn the wheel 22 in anti-clockwise direction by two steps corresponding to two film-frame numbers, but without tripping the shutter. In this position of wheel 22 the arm 37a slides over the projection 22b, so that the lever 37 turns in anti-clockwise direction until it engages the abutment 24. Arm 37c releases the pin 10c so that portion 10b enters the cut-out 9a of gear 9 under the influence of spring 41. This causes pin 10c to lift spring arm 39a off contact S5 and to release it for engagement with contact S3, i.e. to interrupt the motor circuit. The camera is now, after the film 3 has been advanced by a length corresponding to two film frames, ready for the first exposure.

Other desired switching or control functions—not of immediate interest in the context of the present description—may be carried out by the lever 29 which, on entry of the arm 37a behind the projection 22a, is released to follow the movement of lever 37 and which, in so doing, may perform such additional function.

On movement of projection 10b into cut-out 9a the arm 10c pivots lever 40 in clockwise direction out of the path of movement of lug 11c; this permits slide 11 to move until it engages the lever 14. If, now, the release 16 is operated, then the switch S1 is closed and subsequently the lever 14 is pivoted out of the path of slide 11. The latter moves under the influence of spring 12, permitting the pawl 19 to follow and tripping the not-illustrated shutter; arm 11d lifts projection 10b out of cut-out 9a. During the resulting anti-clockwise pivoting movement of lever 10 the spring arm 39a engages contact S5, thereby closing the motor circuit so that upon completion of the shutter operation the film will automatically be transported by one film-frame length. During the pivoting of lever 10 the lever 40 is released so that it can re-enter the path of movement of lug 11c.

During each film transportation by one film-frame length the gear 9 performs one complete revolution. In the course of this revolution the projection 9b shifts the slide 11 under temporary lifting of the lever 40 along the inclined surface 40a beyond the edge of the lever 40, so that lever 40 temporarily holds the slide 11 again. After a revolution of gear 9 the projection 10b re-enters the cut-out 9c, so that film-transporting is terminated by lifting-off of the spring lug 39a from contact S5 and interruption of the motor circuit by engagement of spring by 39a with contact S3. Since lever 40 releases the slide 11 again, the slide 11 moves until it engages lever 14. The next camera release may now be triggered and the preceding cycle thereby be repeated.

When it is desired—after e.g. 36 exposures have been made—to rewind the film, the projection 10b will be lodged in recess 9a and switch S5 will be opened whereas switches S3 and S4 are shorted; in other words, the arrangement will be in the position which it assumes following each exposure. To effect rewinding the slide 45 is moved counter to the direction of arrow 7 and in opposition to its spring 46; this causes the shorting to be terminated and the motor circuit to be completed (in a manner known per se and therefore not illustrated) with concomitant direction reversal of the motor and connection of the motor to the rewinding spool (also known per se). If desired, direction reversal of the motor can be avoided and an appropriate transmission connected between motor and rewinding spool. Any known per se arrangement can be used which is manually actuatable to effect motorized rewinding of a film.

To assure that during rewinding the slide 45 remains in its operating position, the lever 35 urged by spring 47 to snap behind an edge 45a of slide 45. Once the film 3 is fully rewound and thus withdrawn from across the cut-out 2b, the arm 5a of lever 5 passes through cut-out 2b and switch S2 opens, so that the motor stops. The camera cover 1 is then opened and the rewound film removed. Lever 6 returns to the illustrated position and, in so doing, moves pawls 19, 26 and lever 37, 35, 31 and 29 back to their starting positions, which also allows the film counter 22 to return to its illustrated starting position.

It will be appreciated that the invention is susceptible of various modifications. For example, the arrangement may be such that during advancement of the film by one film frame the gear 9 performs only a partial revolution; in that case, several of the cut-outs 9a and a corresponding number of projections 9b would need to be provided on the gear 9, equidistantly spaced about the circumference of the same.

While the invention has been illustrated and described as embodied in a roll film camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a roll film camera having a housing with a back wall movable between open and closed positions, a film-transporting and shutter-cocking arrangement comprising a film counter having a projection and being movable to counting position in response to closing of the back wall and to zero position in response to opening of the back wall; switch means operative for controlling the supply of electrical energy to a camera motor and being movable to closed position in response to insertion of film into the camera and to open position in response to the absence of film in the camera; a control lever having an arm engaging said projection when said film counter is in the zero position and becoming disengaged therefrom in response to repeated stepwise operation of the film counter; a switch in series with said switch means and being closed when said back wall is closed; and a blocking lever engaged by said control lever when said arm engages said projection and becoming released from said control lever when said arm disengages from said projection, so that said blocking lever can cooperate with a film metering means upon transportation of the film by the length of a film frame resulting in deenergization of the motor.

2. An arrangement as defined in claim 1; further comprising operating means on said back wall; a film-movement direction-reversing member movable to and from an operative position in which it triggers rewinding of the film; a direction-reversing lever positioned to be moved into engagement with said member to hold it in said operative position in response to actuation of said reversing lever by said operating means due to said backwall being in closed position; and means for deactivating the motor upon completion of the rewinding.

3. An arrangement as defined in claim 2, said film metering means comprising a sprocket wheel engaging and being moved by the film; further comprising a first gear and a one-way coupling correcting said first gear with said sprocket wheel, a second gear meshing with said first gear and being driven by the same only in the film-advancing direction, said second gear having at least one cut-out into which said blocking lever can enter on completion of film-advancement by the length of a film frame.

4. An arrangement as defined in claim 3; further comprising a slide operative to cock a camera shutter and having a control arm, said second gear having a projection engageable with said slide for moving the same to shutter-cocking position in response to rotation of said second gear, and said control arm being positioned to lift said blocking lever from said cut-out when said slide returns from said shutter-cocking position to a starting position.

5. An arrangement as defined in claim 4; further comprising a pawl for advancing said film counter in stepwise increments; and cooperating portions on said slide and pawl and engageable with one another in response to movement of the slide beyond the shutter-cocking position thereof.

6. An arrangement as defined in claim 5; further comprising means for blocking said slide against return movement subsequent to movement beyond said shutter-cocking position and for releasing the slide for return movement in response to entry of said blocking lever into said cut-out.

* * * * *